United States Patent
Madsen et al.

(10) Patent No.: US 8,130,649 B2
(45) Date of Patent: Mar. 6, 2012

(54) INGRESS TRAFFIC FLOW CONTROL IN A DATA COMMUNICATIONS SYSTEM

(75) Inventors: John Madsen, Ottawa (CA); Joey Chow, Nepean (CA); Dion Pike, Stittsville (CA)

(73) Assignee: Alcatel Lucent, Paris (FR)

( * ) Notice: Subject to any disclaimer, the term of this patent is extended or adjusted under 35 U.S.C. 154(b) by 614 days.

(21) Appl. No.: 11/907,871

(22) Filed: Oct. 18, 2007

(65) Prior Publication Data
US 2009/0103434 A1    Apr. 23, 2009

(51) Int. Cl.
*G01R 31/08* (2006.01)
*G06F 11/00* (2006.01)

(52) U.S. Cl. .................................. 370/235; 370/236

(58) Field of Classification Search .................. 370/229, 370/230, 464, 465, 468
See application file for complete search history.

(56) References Cited

U.S. PATENT DOCUMENTS

| | | | |
|---|---|---|---|
| 6,324,165 B1 * | 11/2001 | Fan et al. | 370/232 |
| 6,952,424 B1 * | 10/2005 | Bass et al. | 370/412 |
| 6,967,923 B1 * | 11/2005 | Fang | 370/232 |
| 7,317,683 B2 * | 1/2008 | Goetzinger et al. | 370/230.1 |
| 7,525,911 B2 * | 4/2009 | Hara et al. | 370/230.1 |
| 2003/0076848 A1 * | 4/2003 | Bremler-Barr et al. | 370/412 |
| 2008/0273545 A1 * | 11/2008 | Sgouros et al. | 370/412 |

* cited by examiner

Primary Examiner — Kevin C Harper
Assistant Examiner — Samina Choudhry
(74) Attorney, Agent, or Firm — Kramer & Amado P.C.

(57) ABSTRACT

Embodiments of the invention provide flow control of incoming data packets to data processing resources via a controller that can receive and react to advanced backpressure messages. These advanced backpressure messages are used to rate limit the data packets based one or more of the following factors: traffic class, traffic priority, destination port. The controller can also generate a traffic preference message to an upstream source of the data packets to inform the upstream unit of the most appropriate type of data that should be transmitted downstream at that time, thereby improving the likelihood of the transmitted data being processed in a proper and timely manner by the downstream data processing resources. Embodiments of the invention can improve the performance of a communications system during periods of congestion by ensuring that high-priority traffic has precedence over traffic of lower priority while maximizing utilization of the ingress data path bandwidth.

19 Claims, 1 Drawing Sheet

INGRESS TRAFFIC FLOW CONTROL IN A DATA COMMUNICATIONS SYSTEM

FIELD OF THE INVENTION

The invention is directed to data packet communications systems, and in particular to controlling the flow of incoming data packets to data processing resources in such systems.

BACKGROUND OF THE INVENTION

Flow control is performed on ingress data packets when the incoming rate of the data packets over a given period of time exceeds the rate at which the data packets can be processed. The excessive incoming rate of data packets results in increased fill-levels of ingress queues to the data processing resources, any of which levels can cause flow control measures to be initiated when the level exceeds a predetermined threshold. One flow control technique used in data communications that is in accordance with the aforementioned principle is backpressure signaling.

A simple backpressure signaling technique is to use on-off signaling. According to this technique, a receiver queue of a data communications system, upon crossing a fill-level threshold, causes a backpressure signal (e.g. halt) to be generated that is sent to the source of the packets. The backpressure signal (halt) indicates to the source that it should suspend sending packets to that queue until further notice, which will be given in the form of another backpressure signal (e.g. resume). In some cases there can be more than one packet source, and in those cases the backpressure signal would normally be sent to all of those sources. A problem with this simple on-off backpressure signaling is that all traffic is treated identically. That is, high-priority, network-control traffic undergoes the same backpressure as low-priority, best-effort traffic, to the point where a flood of low-priority traffic can halt the flow of low-bandwidth, high-priority traffic. Impeding the flow of high-priority traffic can have service affecting implications such as network instability and lost data.

More advanced backpressure signaling techniques are known that use more than simple on-off signaling. These techniques include those that apply flow control to data packets of only certain priorities. According to such techniques, when the fill-level threshold of a priority-specific receiver queue is crossed, traffic of the corresponding priority is halted using on-off backpressure signaling. This approach is able to ensure that low-priority traffic does not impede the flow of higher-priority traffic. However, a disadvantage of this approach is that ingress bandwidth may go unutilized. For example, low priority traffic may be halted when a corresponding fill-level threshold is crossed even when no higher priority traffic is present.

Accordingly, there is a need to provide ingress traffic flow control that gives precedence to high-priority traffic over low-priority traffic while minimizing unutilized ingress bandwidth.

SUMMARY OF THE INVENTION

It is an object of the invention to provide improved method and apparatus for ingress traffic flow control in a data communication system.

According to an aspect of the invention there is provided a traffic flow control system for controlling a flow of ingress data packets to be transmitted over a serial link, the system comprising: a plurality of ingress buffers, one or more of which for storing a respective type of data packets in the flow of ingress data packets; a plurality of rate limiters, one or more of which for providing an amount of rate limiting to a flow of data packets from a respective ingress buffer, the amount of rate limiting being dependent upon a nominal amount of rate limiting adjusted by a weighting factor corresponding to that rate limiter; a multiplexer for receiving data packets from the plurality of rate limiters and serially multiplexing the data packets for transmission over the serial link; and a controller operable to receive a backpressure message indicating a fill-level state of receive queues for receiving data packets from the serial link, and being operable to determine weighting factors for the rate limiters according to the backpressure message.

According to an aspect of the invention there is provided a method of performing flow control on a flow of data packets for transmission over a serial link, the method comprising the steps of: receiving a backpressure message having contents that indicates one of a plurality of fill-level states of receive queues coupled to the serial link for receiving the data packets, wherein one or more of the receive queues corresponds to a respective type of data packet traffic; determining a set of weighting factors by reading them from a mapping of weighting factors to various backpressure messages according to the contents of the backpressure message, wherein the mapping includes for a given backpressure message content, a set of weighting factors of which one or more weighting factors corresponds to a respective type of data packet traffic; and adjusting an amount of rate limiting applied to data packets of like type by a respective weighting factor of the determined set of weighting factors.

Some embodiments of the invention provide flow control of incoming data packets to data processing resources by using an intelligent controller that can receive and react to advanced backpressure messages. The backpressure messages can be considered to be multi-level and multi-dimensional because they provide information on the fill-level of receive queues of different traffic priorities, hence multi-level, and of various traffic types, hence multi-dimensional. These advanced backpressure messages are used to limit the rate of data based on, but not limited to, some of the following factors: class, priority, port, customer, type of data, etc. The intelligent controller may also take this information and generate a traffic preference message to an upstream data processing unit to inform the upstream unit of the most appropriate type of data that should be transmitted downstream at that time, thereby improving the likelihood of the transmitted data being processed in a proper and timely manner by downstream data processing resources.

Advantageously, embodiments of the invention improve the performance of an ingress data path of a communications system by ensuring that high-priority traffic has precedence over traffic of lower priority while maximizing utilization of the ingress data path bandwidth.

BRIEF DESCRIPTION OF THE DRAWINGS

The invention will be further understood from the following detailed description with reference to the drawings, in which.

DETAILED DESCRIPTION

Figure 1:
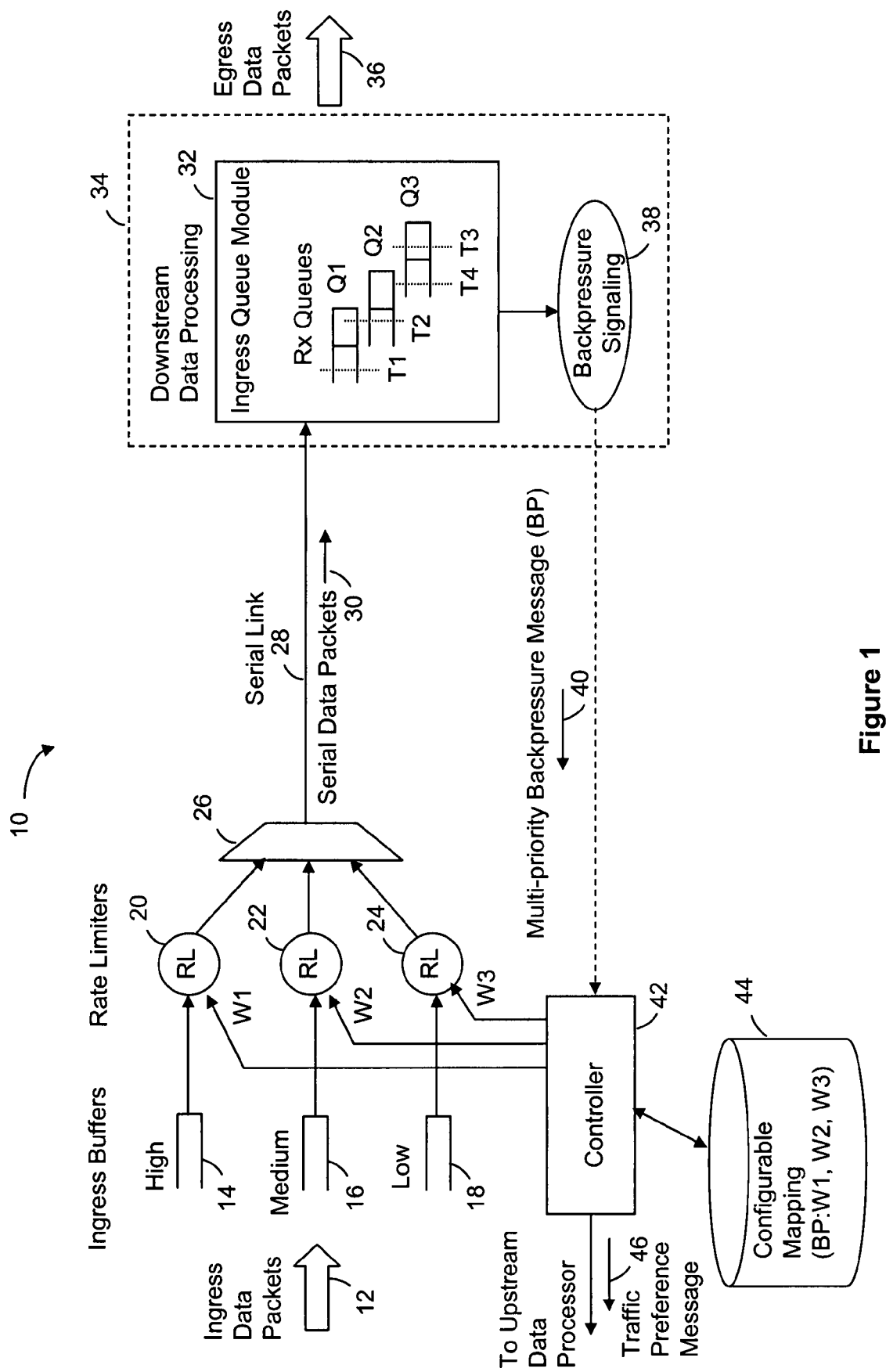
FIG. 1 is a high-level block diagram of an ingress traffic flow control system according to an embodiment of the invention.

Referring to FIG. 1, an ingress traffic flow control system 10 controls the flow of ingress data packets 12 to a downstream data processing unit 34. The system 10 includes ingress buffers 14, 16, 18 for receiving the ingress data packets 12 and temporarily storing them before they are transmitted on a serial link 28 to the data processing unit 34. The ingress buffers 14, 16, 18 are each associated with a respective priority level high, medium, low, and each stores data packets of a corresponding priority therein. Rate limiters 20, 22, 24 control the rate at which data packets from respective ingress buffers 14, 16, 18 are forwarded to a multiplexer 26 that multiplexes the data packets onto the serial link 28. The multiplexer 26 employs a simple round-robin technique to multiplex data packets onto the serial link 28. Each rate limiter 20, 22, 24 applies an amount of rate limiting in accordance with a respective weighting factor W1, W2, W3 provided by a controller 42. Any of the weighting factors may be varied by the controller 42 as will be explained later. The resulting flow of serial data packets 30 on the serial link 28 comprises flows of data packets of high, medium, and low priorities, as may be available in the flow of ingress data packets 12, at individual flow rates that are limited by the corresponding rate limiters 20, 22, 24.

The downstream data processing unit 34 for processing the serial data packets 30 includes an ingress queue module 32 and a backpressure signaling module 38 in addition to data processing functionality, which is not shown for simplicity and because it is not relevant to this embodiment of the invention. The downstream data processing unit 34 receives serial data packets 30 from the serial link 28 and performs data packet processing thereon resulting in a flow of egress data packets 36. As may be necessary from time to time and depending on the respective incoming rates of high, medium and low priority data packets in the flow of serial data packets 30 and on the processing to be performed thereon, the backpressure signaling module 38 may generate and send a multi-priority backpressure message 40 to the controller 42 to affect the flow of serial data packets 30 that are incoming to the data processing unit 34. The generation and use of the multi-priority backpressure message 40 will be explained after the ingress queue module 32 is explained in more detail.

The ingress queue module 32 includes receive queues Q1, Q2, Q3 which each have one or more fill-level thresholds. The receive queue Q3 has two such fill-level thresholds T3 and T4, the latter of which is at a higher level than the former. An example fill-level of the receive queue Q3 is shown as being between the fill-level thresholds T3 and T4. The receive queue Q2 has only one fill-level threshold T2 and is shown having an example fill-level that is below the threshold T2. Likewise, the receive queue Q1 has only one fill-level threshold T1 and is shown having an example fill-level that is below the threshold T1.

The backpressure signaling module 38 generates a multi-priority backpressure message 40 having a given value BP that is determined by considering, in combination, the fill-level of each of the receive queues Q1, Q2, Q3 in comparison to their respective fill-level thresholds T1, T2, T3 and T4. For example, the backpressure signaling module 38 may generate a backpressure signaling message having a content BP=0 if the fill-levels of all the receive queues Q1, Q2, Q3 are below their respective fill-level thresholds T1, T2, T3 and T4; whereas another content BP=1 may be generated for the example fill-levels shown in FIG. 1. The flow control to be performed for a given content BP of the multi-priority backpressure message 40 is determined by the controller 42 according to a configurable mapping 44 of backpressure message 40 content BP to values of the weighting factors W1, W2, W3.

Table 1 shows the an example configurable mapping of weighting factors W1, W2, W3 to backpressure message 40 content BP for various combinations of fill-level of the receive queues Q1, Q2, Q3 compared to their respective fill-level thresholds T1, T2, T3 and T4. The receive queues Q1, Q2, Q3 correspond to traffic priorities of high, medium and low, respectively. In the table, under the weighting factors "none" means no rate limiting, "block" means halt traffic flow, and "limit" means normal rate limiting for the given priority of traffic. The specific amount of rate limiting corresponding normal rate limiting could be anywhere between the former two rate limiting extremes, i.e. halt traffic and no rate limiting, and would be configurable. To preserve the precedence of higher priority traffic over lower priority traffic, the amount of rate limiting corresponding to normal rate limiting would increase for progressively lower priorities of traffic. In this way, when all of the rate limiters 20, 22, 24 are applying normal rate limiting, e.g. corresponding to BP=7 in Table 1, the precedence of higher priority traffic over lower priority traffic would be maintained. Furthermore, with reference to BP=8 in Table 1, good bandwidth utilization is maintained by not blocking low priority traffic even if the fill level of the corresponding receive queue Q3 has exceeded the 2nd fill-level threshold T4, as long as the fill levels of the medium and high priority receive queues Q2 and Q1 are below their respective fill-level thresholds T2 and T1.

TABLE 1

Configurable mapping of weighting factors

| BP | Q1 fill level | Q2 fill level | Q3 fill level | W1 | W2 | W3 |
|---|---|---|---|---|---|---|
| 0 | <T1 | <T2 | <T3 | None | None | None |
| 1 | <T1 | >T2 | <T3 | None | None | None |
| 2 | >T1 | <T2 | <T3 | None | None | Limit |
| 3 | >T1 | >T2 | <T3 | None | Limit | Limit |
| 4 | <T1 | <T2 | >T3, <T4 | None | None | Limit |
| 5 | <T1 | >T2 | >T3, <T4 | None | Limit | Limit |
| 6 | >T1 | <T2 | >T3, <T4 | None | Limit | Limit |
| 7 | >T1 | >T2 | >T3, <T4 | Limit | Limit | Limit |
| 8 | <T1 | <T2 | >T4 | None | None | Limit |
| 9 | <T1 | >T2 | >T4 | None | Limit | Block |
| 10 | >T1 | <T2 | >T4 | None | None | Block |
| 11 | >T1 | >T2 | >T4 | Limit | Block | Block |

It should be understood that the foregoing is a simple embodiment of the invention. Other, more complex embodiments could have hundreds of receive queues Q1, Q2, Q3 and ingress buffers 14, 16, 18 and corresponding rate limiters 20, 22, 24. Any of the receive queues Q1, Q2, Q3 could be a hierarchical grouping of sub-queues. Furthermore, any of the receive queues Q1, Q2, Q3 could be associated with one or more of traffic priority, class, type, source port, destination port, etc. Likewise with the ingress buffers 14, 16, 18 and corresponding rate limiters 20, 22, 24. However, regardless of the foregoing variations, these embodiments would have two common aspects: a backpressure signaling module 38 that is operable to generate and transmit a backpressure message 40 that provides an indication of that status of the fill-level of receive queues Q1, Q2, Q3 in comparison to their respective fill-level thresholds T1, T2, T3 and T4; and a controller 42 operable to receive the backpressure message 40 and determine, an amount of rate limiting to apply to ingress data packets depending on the content BP of the backpressure message 40 and a configurable mapping 44 of the content BP and rate limiting weighting factors W1, W2, W3.

The configurable mapping 44 would be configured for a given communication system according to the data processing resources that are present in the system and other service or application specific provisioning existing in the system, for example as could relate to one or more virtual private networks. The controller 42 using the configurable mapping 44 along with the content BP of the backpressure message 40 determines rate limiting that should be performed on the ingress data packets as a method of flow control. This rate limiting may be based on, but is not limited to, some of the following factors: traffic class, traffic priority, destination port, customer network e.g. VPN, type of data, etc. This rate limiting is implemented by altering weighting factors W1, W2, W3 in one or more of the rate limiters 20, 22, 24, as specified in the configurable mapping 44. Such an intelligent controller 42 can not only interpret simple on-off (link-level or per-virtual output queue (VOQ)) backpressure messages but also advanced backpressure messages 40 that can include priority, class, type of traffic, source port, destination port, etc. These advanced backpressure messages 40 can be considered multi-level and multi-dimensional.

These advanced backpressure messages 40 that are sent during periods of congestion or near-congestion allow a downstream data processing unit 34 to aid the controller 42, which data to best send next. The controller 42 uses this advanced backpressure message 40 and the configurable mapping 44 to determine the most appropriate data to transmit next. The controller may generate a traffic preference message 46 to convey this determination to an upstream data processing unit to inform the upstream unit of the most appropriate type of data that should be transmitted downstream at that time, thereby improving the likelihood of the transmitted data being processed in a proper and timely manner by downstream data processing resources. Thus, the intelligently selected traffic has a lower probability of being rejected by the downstream data processing unit 34 resulting in improved system performance. For example, referring to Table 1 under BP=9, the traffic preference message would indicate that high priority traffic is preferred since medium priority traffic will be rate limited and low priority traffic will be blocked.

Data processing units that can make use of these traffic preference messages 46 include enhanced buffer managers that incorporate multi-level multi-dimensional aspects in their arbitration schemes. Additionally, a memory-less admission check-point for the passage of data could also make use of the traffic preference messages 46. Such a check-point would use the information in the traffic preference message 46 to provide instantaneous admittance of preferred, hence highly valued, data during times of data congestion at the downstream data processing unit, thereby improving the effectiveness of the data communications system.

Advantageously, the use of a controller 42 capable of receiving and reacting to advanced backpressure messages 40 improves system throughput efficiency. Appropriate data is transmitted to the downstream data processing unit 34 during periods of traffic congestion resulting in lower loss of high valued data. The more high valued data that can be processed, especially during periods of congestion, or near-congestion, the greater value the communication system is to an end user.

Numerous modifications, variations and adaptations may be made to the embodiments of the invention described above without departing from the scope of the invention, which is defined in the claims.

What is claimed is:

1. A method of performing flow control on a flow of data packets for transmission over a serial link, the method comprising the steps of:
   a) receiving, at a traffic control system, from a downstream data processing unit, a backpressure message having contents that indicate the fill level state of each of a plurality of receive queues in the downstream data processing unit coupled to the serial link for receiving the data packets, wherein each of the receive queues corresponds to a respective type of data packet traffic;
   b) determining a set of weighting factors from the backpressure message by reading the weighting factors from a mapping of various backpressure message contents to sets of weighting factors, wherein each weighting factor corresponds to a respective type of data packet traffic; and
   c) adjusting an amount of rate limiting applied to data packets from an ingress buffer associated with a respective type of data packet by a respective weighting factor of the determined set of weighting factors.

2. The method of claim 1, further comprising generating a traffic preference message for transmission to a source of the flow of data packets, the traffic preference message indicating a type of data packet traffic preferred for transmission over the serial link in accordance with the determined set of weighting factors.

3. The method of claim 2, wherein the type of data packet is distinguished by one or more of the following parameters: traffic priority, traffic class, destination port, destination address, source address, and virtual private network identifier.

4. The method of claim 1, wherein the fill-level state of each of a plurality of receive queues corresponds to a comparison of the occupancy of the receive queue to one or more fill-level thresholds for that queue.

5. The method of claim 1, wherein a weighting factor in a given set of weighting factors corresponds to one type of data packet traffic and has a value that is dependent on a fill-level state of a receive queue for the same type of data packet traffic and on a fill-level state of another receive queue for a different type of data packet traffic.

6. The method of claim 1, wherein the weighting factors are configurable so as to effect, for at least one type of data packets, an amount of rate limiting having a value in an inclusive range between one extreme of no rate limiting and another extreme of blocking all data packets of that type.

7. The method of claim 6, wherein the weighting factors have been configured for a given communication system according to one or more of: data processing resources that are present in the system, service-specific or application-specific provisioning existing in the system.

8. A traffic flow control system for controlling a flow of ingress data packets to be transmitted over a serial link, the system comprising:
   a plurality of ingress buffers, each ingress buffer for storing a respective type of data packets in the flow of ingress data packets;
   a plurality of rate limiters, each for providing an amount of rate limiting to a flow of data packets from a respective ingress buffer, the amount of rate limiting being dependent upon a nominal amount of rate limiting adjusted by a weighting factor corresponding to a respective type of data packets associated with that rate limiter;
   a multiplexer for receiving data packets from the plurality of rate limiters and serially multiplexing the data packets for transmission over the serial link; and
   a controller operable to receive a backpressure message indicating a fill-level state of each of a plurality of receive queues for receiving data packets from the serial link, and being operable to determine weighting factors for the respective types of data packets according to the backpressure message by reading the weighting factors from a mapping of various backpressure message contents to sets of weighting factors.

9. The system of claim 8, further comprising a backpressure signaling module operable to generate the backpressure message by comparing fill levels of the receive queues with respective fill-level thresholds.

10. The system of claim 9, wherein one or more of the receive queues are associated with a respective type of data packets.

11. The system of claim 10, wherein the type of data packets is distinguished by one or more of the following parameters: traffic priority, traffic class, destination port, destination address, source address, and virtual private network identifier.

12. The system of claim 8, wherein the weighting factors are configurable so as to effect, for at least one type of data packets, an amount of rate limiting having a value in an inclusive range between one extreme of no rate limiting and another extreme of blocking all data packets of that type.

13. The system of claim 12, wherein the weighting factors have been configured for a given communication system according to one or more of: data processing resources that are present in the system, service-specific or application-specific provisioning existing in the system.

14. The system of claim 10, wherein a weighting factor associated with a specific backpressure message and type of data packets has a value in the mapping that is dependent on a fill-level of a receive queue for the same type of data packets and on a fill-level of another receive queue for different type of data packets.

15. The system of claim 8, wherein the controller is further operable to generate a traffic preference message for transmission to a source of the flow of ingress data packets, the traffic preference message indicating a type of data packet traffic preferred for transmission over the serial link in accordance with the determined weighting factors.

16. The system of claim 14, wherein the weighting factor associated with the lowest priority traffic is lower when the fill-level state of the receive queue associated with a higher priority traffic is below the respective threshold for the higher priority receive queue than when the fill-level state of the receive queue associated with higher priority traffic is above the respective threshold for the higher priority receive queue.

17. The method of claim 5, wherein when the fill-level state of the lowest priority receive queue is greater than a threshold for the lowest priority receive queue and the fill level state of a higher priority receive queue is lower than a threshold for the higher priority receive queue, the weighting factor for the lowest priority traffic allows traffic to transmit from the lowest priority ingress buffer.

18. The method of claim 4, wherein when the fill-level state of a receive queue for one type of data traffic is above the respective threshold, the weighting factor for the one type of traffic does not limit the one type of traffic.

19. The method of claim 5, wherein the weighting factor corresponding to a lowest priority traffic depends on a fill-level state of a lowest priority receive queue and a fill-level state of a higher priority receive queue.

* * * * *